(No Model.) 2 Sheets—Sheet 1.
T. FERGUSON.
APPARATUS FOR DRAWING AERATED LIQUIDS FROM FOUNTS OR RESERVOIRS.
No. 435,489. Patented Sept. 2, 1890.
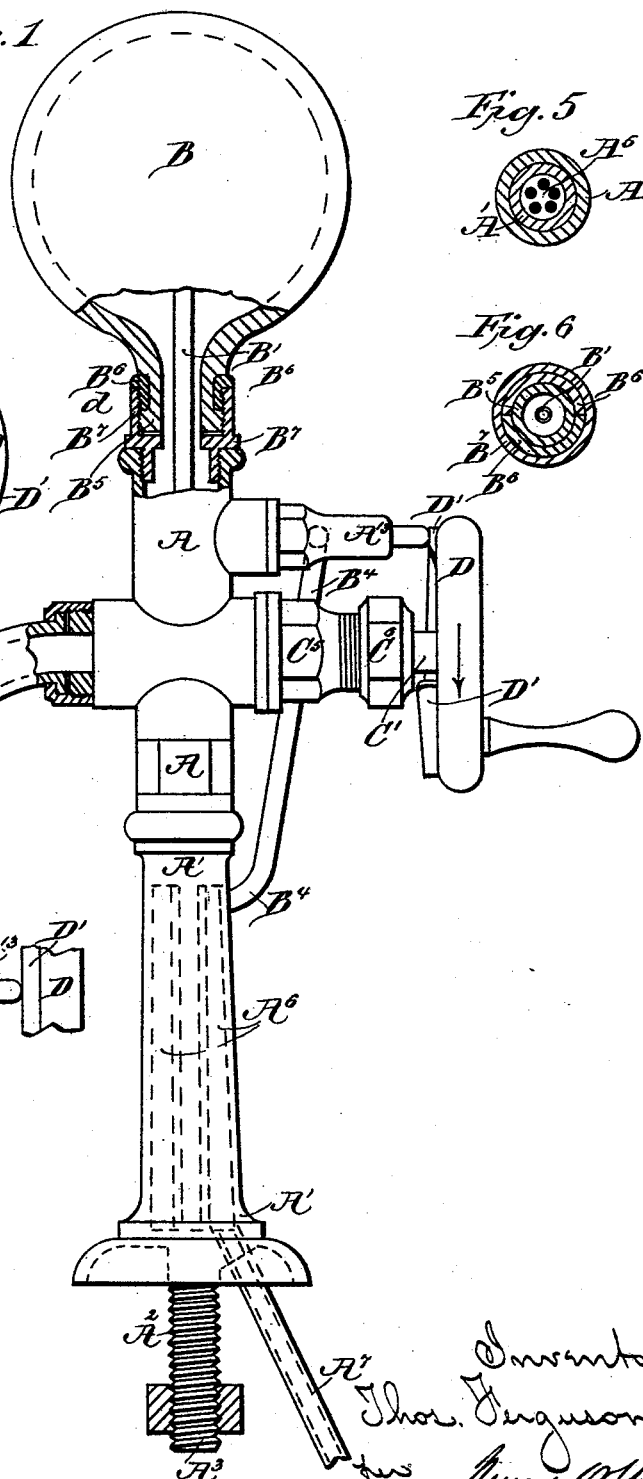

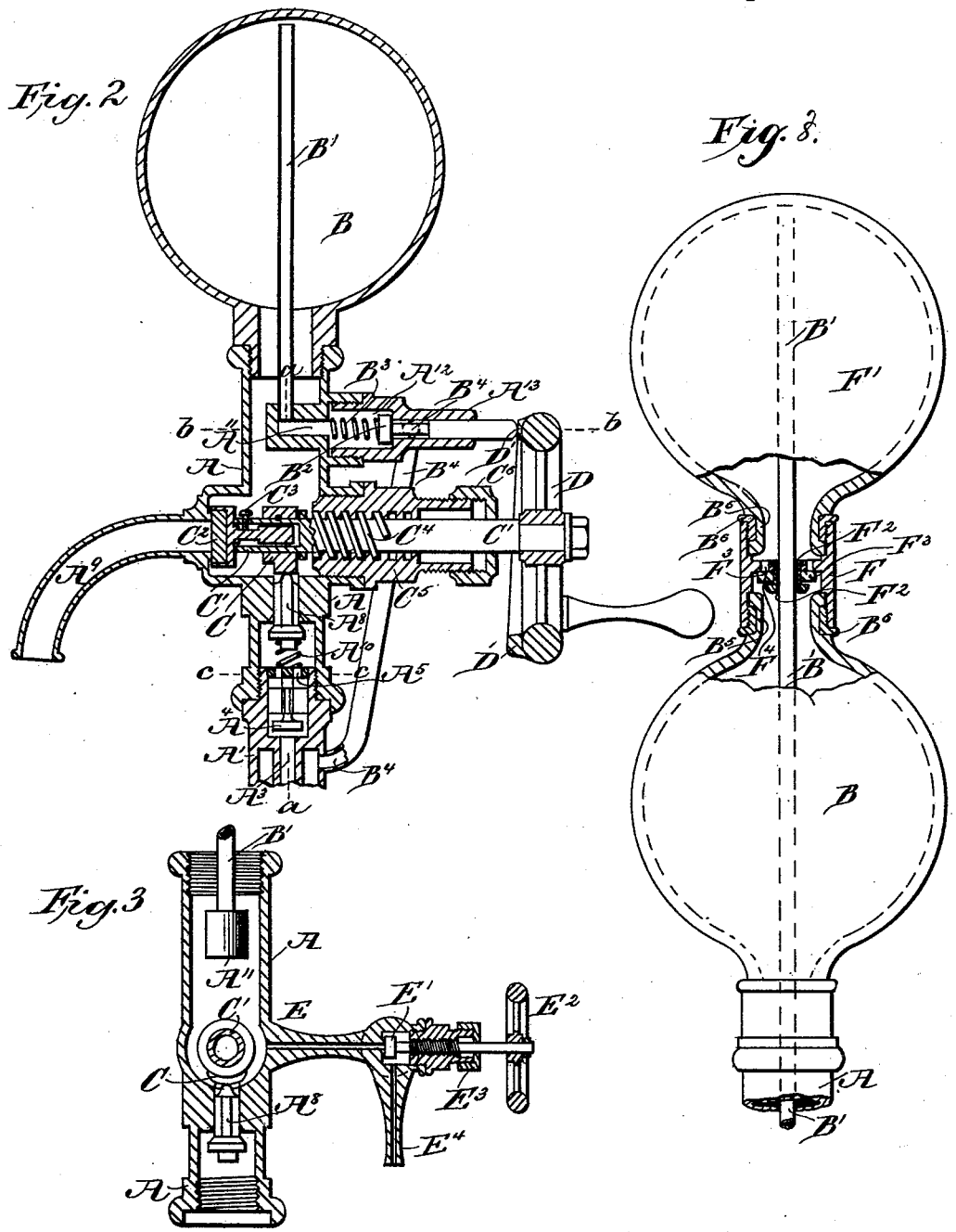

UNITED STATES PATENT OFFICE.

THOMAS FERGUSON, OF ALBERT PARK, NEAR MELBOURNE, ASSIGNOR TO EVAN ROWLANDS, OF MELBOURNE, VICTORIA.

APPARATUS FOR DRAWING AERATED LIQUIDS FROM FOUNTS OR RESERVOIRS.

SPECIFICATION forming part of Letters Patent No. 435,489, dated September 2, 1890.

Application filed January 31, 1888. Serial No. 262,576. (No model.)

*To all whom it may concern:*

Be it known that I, THOMAS FERGUSON, bottler, a subject of the Queen of Great Britain, residing at Harold Street, Albert Park, near Melbourne, in the British Colony of Victoria, have invented a new and useful Improved Apparatus for Drawing Aerated Liquid from Founts or Reservoirs, of which the following is a specification.

This invention of improved apparatus for drawing aerated liquid from founts or reservoirs has been designed to enable it to be supplied to a drinking-vessel in a comparatively quiescent state, notwithstanding that it is drawn from a fount or reservoir in which it is retained at a high pressure. This is accomplished by allowing the aerated liquid to flow into an intermediary chamber, in which the excess of pressure in the liquid beyond atmospheric pressure is allowed to blow off before it is drawn off into the drinking-vessel. By this means it retains a greater percentage of gas than if it were delivered under pressure into an open vessel, as from an ordinary siphon. The main feature of this invention, therefore, is the introduction of an intermediate chamber for the reception of the aerated liquid after it leaves the fount or reservoir and before it enters the drinking-vessel.

In this specification I have shown the two best apparatuses known to me which illustrate my invention; but I do not confine myself to these, as it would be comparatively easy for persons skilled in the art to which this invention relates to construct other apparatus which would embody my invention. The form of apparatus which I prefer is one in which the intermediary chamber takes the form of a glass or metal sphere or cistern and is placed on the top end of a vertical stand-pipe, which at its lower end is attached to the fount supply-pipe. This stand-pipe is furnished with a spout and three valves, one of which governs the supply from the fount, the second governs the blow-off of the surplus pressure from the intermediary chamber, and the third governs the supply from the intermediary chamber to the tap or spout. These valves are all controlled by the one hand-wheel, which is arranged on the spindle of the said latter supply-valve. A modification of this form of apparatus is to make the intermediary chamber of two spheres, one above the other, and connected together by a neck in which a valve is arranged, as hereinafter explained.

In order that my invention may be well understood, I will now proceed to describe it with reference to the accompanying sheet of drawings, in which—

Figure 1 is a side elevation of one form of my apparatus, showing in section the connection between a glass spherical intermediary chamber and the stand-pipe, and also the connection between a glass spout and the stand-pipe. Fig. 2 is a central vertical section of the essential parts of Fig. 1, showing the intermediary chamber and the delivery-spout as constructed of metal. Fig. 3 is a central vertical section on line $a\ a$, Fig. 2, and showing the spray-tap connected to the branch piece A of the stand-pipe. Fig. 4 is a transverse section on line $b\ b$, Fig. 2, showing the blow-off valve in its altered position. Fig. 5 is a transverse section on line $c\ c$, Fig. 2; Fig. 6, a transverse section on line $d\ d$, Fig. 1, while Fig. 7 is a plan of the inner face of the hand-wheel, showing the extent of the cam-face thereon. Fig. 8 shows a modification of my apparatus with an alternative construction of intermediary chamber in the form of two glass spheres or globes instead of one, as in Figs. 1 and 2.

The stand pipe or pillar is made in two parts A and A', the lower part A' having a screwed lower end $A^2$ for connecting its central hole $A^3$ with the supply-pipe leading from the fount or supply-reservoir.

Above the upper end of the central hole $A^3$ a winged valve $A^4$ is arranged, and the stop for this valve consists of a perforated disk $A^5$, which is screwed in position, as shown.

$A^6$ is an annular chamber formed in the pillar A' to receive the blow-off from the intermediate chamber and convey it to the waste-pipe $A^7$.

Parts A and A' are screwed together, as shown, and in the lower part of A is another winged valve $A^8$, which governs the supply leading from the fount to the intermediary chamber B. This valve $A^8$ is opened and closed by the cam C, secured on the trunk or hollow end of the spindle C', which has at its end the valve $C^2$, which governs the opening leading to the delivery-spout $A^9$. The neck or spindle of valve $C^2$ is arranged in the trunk end of the spindle C', and is secured therein by the pin $C^3$, the point of which passes into a recess in the neck of the valve. Spindle C' is screwed at $C^4$, and such screw fits in the nut $C^5$, screwed into a suitable branch at the side of the pillar A, and the outer end of this nut is furnished with a stuffing-box and gland $C^6$, as shown, to make a good joint around the spindle C'.

$A^{10}$ is a coiled or spiral spring arranged to press upward the valve $A^8$.

B' is the blow-off or vent pipe leading from near the top of the intermediary chamber to the elbow $A^{11}$, formed in the interior of the upper part A of the pillar, and this elbow leads to the chamber $A^{12}$, in which a valve $B^2$ is arranged, which is pressed against its seating by a coiled or spiral spring $B^3$. The stem of this valve extends outward through its bearing-piece $A^{13}$, and is acted upon by a cam-face D' on the inner face of a hand-wheel D, which is secured on the before-mentioned screwed valve-spindle C'. A branch pipe $B^4$ leads from a passage under the valve $B^2$, and the lower end of this pipe is led to the annular chamber $A^6$, formed in the pillar A'. When the intermediary chamber B and spout $A^9$ are formed of metal, they are connected to the part A, as shown in Fig. 2; but when constructed of glass, as in Fig. 1, the intermediary chamber has a neck $B^5$ with a recess in it, and in this recess is fitted a screwed coupling-piece $B^6$, (made in halves,) which fits in the socket $B^7$, screwed or otherwise attached to the top end of the piece A. The spout, when constructed of glass, has a flange $A^{14}$ formed at its upper end, and this is grasped by a metal coupling $A^{15}$, which is screwed to the part A. Suitable insertions are provided between the glass and the metal to make a joint, and these constructions are shown in Fig. 1.

When the intermediary chamber is formed in two parts, as shown in Fig. 8, and constructed of glass, the lower sphere B has an upper neck $B^5$, as well as a lower one, and this upper neck is connected, as described for the lower neck, to the coupling-piece F, to the top of which another sphere F' is secured in a similar manner. The blow-off pipe B' extends to near the top of the upper sphere, and around it in the center of the coupling F is a narrow annular passage $F^2$, and beyond this passage an india-rubber valve $F^3$, arranged on a perforated seating $F^4$. These spheres, if desired, may also be constructed of metal.

The spray-tap for taking off the aerated liquid at its full pressure may or may not be attached to the apparatus. Fig. 3 shows it attached to the part A, a branch E springing therefrom at a position at right angles to the spout $A^9$, and the end of this branch is furnished with a valve-chamber and valve E', which is opened and closed by a small hand-wheel $E^2$, the spindle of which is furnished with stuffing-box and gland, as shown. $E^4$ is its downwardly-projecting nozzle or spout.

The mode of operation is as follows: The apparatus being arranged, say, in the bar of a hotel, and its lower branch $A^2$ connected to the supply-pipe leading from the fount or supply-reservoir which contains the aerated liquid. Now when it is wished to draw off a supply the hand-wheel is turned in the direction indicated by the arrow, its first effect being to allow the supply-valve $A^8$ to close by rotating the cam C clear of its top end, and this is done while the outer stem of blow-off valve $B^2$ is in the gap between the cam-face D' of the hand-wheel. Then immediately such valve $A^8$ is closed, the blow-off valve $B^2$ is opened by the cam-face D' passing under its stem, and so forcing it inward to open the valve. The excess of pressure now blows off through parts marked $B^4$ and $A^6$ to the waste-pipe $A^7$, and when the hand-wheel has performed about a third of its revolution the pin $C^3$, attached to screwed spindle C', comes into contact with the shoulder on the stem of valve $C^2$, and so opens it to allow of the supply quietly falling out through the spout $A^9$ to the drinking-vessel. The back face of the cam C, contacting with the inner face of the nut $C^5$, forms a stop to regulate the travel of the hand-wheel. After the requisite supply is taken from the apparatus the hand-wheel is re-turned back, when the supply is again cut off and the apparatus assumes its normal condition, with the blow-off passage closed and the supply-valve from the fount open. When a spray of aerated liquid for mixing purposes is required, the valve E' is opened, which admits of the outflow of the liquid under pressure. When the intermediary chamber is formed of two spheres, as shown in Fig. 8, the liberated gas gathers in the upper sphere and is blown off therefrom through the pipe B', as before, the lower chamber being thus retained full of the aerated liquid, in readiness for being discharged when the supply is cut off from the fount and the valve governing the outlet-spout $A^9$ opened.

Having now particularly described and ascertained the nature of my said invention and in what manner the same is to be performed, I declare that what I claim is—

1. In an apparatus for dispensing aerated liquids, the combination, with the fount or reservoir, a spherical dispensing-chamber provided with a tubular neck, and a coupling for detachably coupling said parts together, said coupling being provided with an axial passage for the liquid leading directly into the dispensing-chamber, a discharge-passage and a gas-passage, both formed at right angles to the axial passage, of valves in said passages for controlling the flow of liquid to the dispensing-chamber and the discharge of the liquid and gas, respectively, and a gas-pipe extending axially through the dispensing-chamber and terminating near the upper end thereof, said gas-pipe being detachably connected with the horizontal gas-passage, substantially as and for the purposes specified.

2. In an apparatus for dispensing aerated liquids, the combination, with the fount or reservoir, a dispensing-chamber and a tubular connection between the two, provided with an annular gas-passage surrounding the passage for the aerated liquid, and a waste-pipe connected with said passage, of a valve for controlling the admission of the liquid to the dispensing-chamber, a gas-duct connected with the dispensing-chamber, a valve interposed in said duct to control the escape of the gas from said chamber, and a connection between the gas-duct and annular passage of the tubular connection to conduct the waste gases to said passage and waste-pipe, substantially as described.

3. The combination, with the fount, the dispensing-chamber B, gas-duct B', valve-casing $A^{13}$, and the valve and its spindle $B^2$, of the dispensing-valve $C^2$, having a recessed spindle, the valve-operating spindle C', into which the valve-spindle projects, the pin or screw $C^3$, projecting through the operating-spindle into the groove of the valve-spindle, and the hand-wheel D, provided with the cam-face D', against which the spindle of valve $B^2$ impinges, said parts being arranged and operating substantially as and for the purposes specified.

4. The combination, with the fount, the dispensing-chamber B, gas-duct B', the valve and its spindle $B^2$, the valve and spindle $A^8$ $A^{10}$, and the dispensing-valve $C^2$, provided with a recessed or grooved spindle, of the valve-operating spindle C', into the end of which the spindle of the dispensing-valve projects, the screw or pin $C^3$, projecting through the operating-spindle into the groove of the valve-spindle, the cam or eccentric C in contact with the spindle of the admission-valves, and the hand-wheel D, provided with a cam-face in contact with the spindle of the valve $B^2$, said parts being arranged and operating substantially as and for the purposes specified.

5. In an apparatus for dispensing aerated liquids, the combination, with the fount, a dispensing-chamber, a superposed gas-chamber, a tubular connection between the two, and a gas-duct extending axially through both chambers and terminating near the upper end of the gas-chamber, of an admission-valve, a gas-escape passage connected with the axial gas-duct, a valve for controlling the escape of the gas, a dispensing-valve, and valve-operating mechanism interposed between the fount and dispensing-chamber, substantially as and for the purposes specified.

6. In an apparatus for dispensing aerated liquids, the combination, with the fount, a dispensing-chamber, a tubular connection or coupling between the two, a gas-escape passage and valve for controlling the escape of the gas, and admission and dispensing valves for controlling the admission and discharge of the liquid to and from the dispensing-chamber, of a gas-chamber arranged above the dispensing-chamber, a tubular connection between the two, a gas-duct connected with the gas-escape passage extending axially through both chambers and terminating near the roof of the gas-chamber, a partition interposed in said connection between the chambers and provided with an axial opening of greater diameter than the axial gas-duct passing therethrough, said partition being also provided with valve-ports, and a valve operating in conjunction with said ports, substantially as and for the purposes specified.

THOMAS FERGUSON.

Witnesses:
WALTER SMYTHE BAYSTON,
WALTER CHARLES HART.